United States Patent [19]

Reimpell et al.

[11] 4,259,979

[45] Apr. 7, 1981

[54] CLOSURE FIXTURE AND ASSEMBLY CAP

[75] Inventors: Uwe Reimpell, Hanau am Main; Reinhard Reiter, Gelnhausen; Lutz Grein, Hanau am Main, all of Fed. Rep. of Germany

[73] Assignee: Leybold - Heraeus GmbH, Cologne, Fed. Rep. of Germany

[21] Appl. No.: 824,202

[22] Filed: Aug. 12, 1977

[30] Foreign Application Priority Data

Aug. 21, 1976 [DE] Fed. Rep. of Germany ....... 2637751

[51] Int. Cl.³ .............................................. F16K 43/00
[52] U.S. Cl. ..................................... 137/315; 220/256
[58] Field of Search .......................... 137/315; 220/256

[56] References Cited

U.S. PATENT DOCUMENTS

| | | | |
|---|---|---|---|
| 2,964,063 | 12/1960 | Guenther | 137/315 |
| 3,113,585 | 12/1963 | Kinney et al. | 137/315 |
| 3,689,979 | 9/1972 | Palet | 137/315 |
| 3,800,972 | 4/1974 | Raymond | 220/256 |
| 3,906,992 | 9/1975 | Leach | 137/315 |
| 4,090,604 | 5/1978 | Reifert | 220/256 |

*Primary Examiner*—Martin P. Schwadron
*Assistant Examiner*—G. L. Walton
*Attorney, Agent, or Firm*—Sprung, Felfe, Horn, Lynch & Kramer

[57] ABSTRACT

A closure fixture has a slide member or valve for radioactive and toxic media, a fixture housing, a housing cover connected to the housing via a first sealing surface and a closure device with a drive mechanism arranged on the housing cover. The housing fixture comprises an additional sealing surface and an assembly cap has an interior configured to receive the housing cover, an enclosure device and is sealingly mountable to the additional sealing surface. The assembly cap comprises at least one manipulating device for transferring the housing cover together with the closure device into the interior of the assembly cap.

12 Claims, 2 Drawing Figures

CLOSURE FIXTURE AND ASSEMBLY CAP

BACKGROUND OF THE INVENTION

The present invention relates to a closure fixture, preferably to a slide member or a valve for radioactive and toxic media, provided with a fixture housing, a housing cover connected to the housing via a sealing surface, and a closure device with drive means arranged on the housing cover.

Many different types of closure fixtures are known. In this connection, linear and pendulum slide members are preferred, and in particular pendulum slide members are characterized by a very compact structure with regard to their drive mechanism as DT-OS No. 25 11 591.

In the case of closure fixtures for radioactive and/or toxic gases, special safety measures have to be taken when effecting repairs on account of wear or destruction of an operating part. All operating parts and thus also parts subjected to wear and tear which come into contact with a radioactive or toxic medium must first of all undergo a special cleaning process before they can be handled in the usual way. During the removal of internal operating parts from the fixture housing, protective clothing, breathing apparatus and other safety devices must be employed, and in addition there is the danger of contamination of the surrounding environment. In order to prevent such contamination special protective tents or chambers have to be erected in some cases over the fixtures being repaired.

In order to reduce the resultant difficulties during repair work, dismantling devices are used in special cases, especially with reactors, which are adapted to the local conditions and form a type of protection room with manipulating devices employed in the region of the fixture being repaired. Such dismantling devices are designed as assembly aids and must be adapted to the existing constructional parts of the plant. This has the resultant disadvantage that they are generally extremely complicated and cannot be universally used, and on the one hand are expensive to supply and on the other hand are difficult to maintain and operate.

SUMMARY OF THE INVENTION

The object of the invention is to provide the necessary means and devices so that the internal operating parts of the aforementioned closure fixtures can be dismantled, if necessary repaired, and reinstalled without the operating personnel and/or the environment being harmed thereby, and without having to carry out time-consuming and expensive work and procedures at the repair site.

The aforementioned objective is achieved according to the invention by providing the housing cover with an additional sealing surface on which an assembly cap can be sealably placed, whose interior is appropriately shaped to receive the housing cover and the closure device.

The additional sealing surface for the assembly cap can be formed in various ways. It may for example be formed by an enlargement of the sealing surface between the housing cover and the fixture housing. In such a case the additional sealing surface surrounds the sealing surface for the housing cover on all sides over its whole circumference. It is however also possible to design the additional sealing surface for the assembly cap in the form of an additional sealing flange.

By virtue of the measures according to the invention, the closure fixture and assembly cap form a type of repair unit during work on the internal operating parts, which unit is separated during normal operation, and in which each part has its own special function. Thus, the closure fixture serves to seal off the medium in question, and the assembly cap can be used as a transportation, cleaning and preparation device for the operating parts of the closure fixture which are being dismantled. In this connection, the assembly cap can be extremely simple. The cap can be used in conjunction with all closure fixtures, if necessary also with closure fixtures of varying nominal widths, in which the additional sealing surface has the same dimensions. All that is necessary is to coordinate equal dimensioned sealing surfaces, guide element and handle part for the manipulating devices with the different closure fixtures of a plant or installation, with the result that in principle only a single assembly cap is required for the needs of the plant or installation. Additional assembly caps can of course be provided for further built-in parts or closure devices, but in this case these should of course be combinable with all the closure fixtures of the relevant region to form a repair unit.

The invention can be implemented in a particularly advantageous manner if a manipulator device for transferring the housing cover with closure device and drive means to the interior of the assembly cap is associated with said assembly cap. Various known drive means, closed per se, may be used as manipulator devices. Hydraulic, pneumatic and mechanical drives, such as for example spindle drives, could be used. However, a particularly simple form of manipulator device is a cable control means whose cable drum is arranged in the interior of the assembly cap. In this connection, the cable is simply pulled down so that it hangs in a suitable device on the housing cover, immediately before the assembly cap is placed on the closure fixture, and in this way the system is made ready for immediate use. In order to prevent the closure device on the housing cover damaging the seal bearing surface or surfaces during transportation, according to a further feature of the invention it is proposed to provide the assembly cap with guide elements for a predetermined movement of the housing cover from its sealing surface on the fixture housing as far as the end position in the assembly cap, and vice versa. If for example the closure device is formed as a one-sided or double-sided acting linear or pendulum slide member, the slide member plates, when in a position raised with respect to their seal bearing surface, can be removed from the fixture housing and parallel to said bearing surface without any danger of damaging the seal bearing surface and/or slide member plate.

The operating parts can be assembled and dismantled in a particularly easy way by introducing appropriate means, such as for example guides, centring devices, etc., on the closure fixture and the assembly cap. By choosing suitable tolerances for the operating parts, all the operating parts together with the cover, or also individual parts, can be replaced quickly via the assembly cap, with the result that operating interruptions of the installation caused by work on the closure fixture can be kept to a minimum. This is particularly advantageous in large installations in which such fixtures are used.

In order on the one hand to be able to reoperate the installation to which the fixture belongs, and on the other hand to be able to clean and repair the assembly cap with the dismantled fixture parts, according to a further aspect of the invention it is proposed that the assembly cap has a divided housing, the dividing joint running substantially parallel to the sealing surface between the fixture housing and the assembly cap, so that a housing upper part and a housing lower part (referred to the normal assembly position) are formed, and closure elements are arranged in the housing upper part on the one hand and in the housing lower part on the other hand.

When adopting this procedure, the closure elements can be brought into the closure position after the dismantling of the fixture parts has been completed, the interior of the assembly cap and the interior of the fixture housing thereby being hermetically separated from one another. To carry out cleaning and repair work the assembly cap is then separated at the dividing joint. The housing lower part together with the closure element remains on the fixture housing, and the housing upper part of the asembly cap, which is provided in the vicinity of the dividing joint with the other closure element, can be transferred, as a closed chamber, for further treatment.

In the case just described the housing cover together with the relevant fixture parts passes downwardly through the housing lower part until it reaches its end position in the housing upper part of the assembly cap. In order to ensure a satisfactory guidance of the moving parts in this case also, the guide elements of the housing upper part and those in the housing lower part are aligned with respect to one another.

It is also advantageous to provide the assembly cap with supports which extend downwardly over the sealing surface between the fixture housing and assembly cap. In this way it is possible to place either the housing upper part after separation at the dividing joint or the whole assembly cap on a base without any danger of damaging the sealing surface.

Further, it is advantageous to provide the assembly cap with a suction piece for connection to a vacuum pump so that a vacuum can be generated in the assembly cap, particularly however in the chamber formed between the two closure elements, thereby preventing any escape of radioactive and/or toxic media into the atmosphere when releasing the connection in the aforementioned dividing joint.

Finally, it is also possible to provide the assembly cap with inlet and outlet pipes for charging the system with a cleansing medium.

In this way the assembly cap is converted into a rinsing and drying room as well as a wash container for cleaning the cover together with the operating parts of the fixture by means of gases or liquids. By suspending the assembly cap in the vicinity of the center of gravity, for example by means of a trunnion mounting, it is also possible to impart a rotational or tumbling movement to the assembly cap, whereby the cleaning effect is enhanced.

In addition, it is possible to coordinate the interaction between the manipulator device and the guide elements in the assembly cap so that the housing cover of the closure fixture together with the relevant fixture parts is secured in a position after dismantling or after cleaning in which the operating parts of the closure fixture are easily accessible for repair. This is the case for example if the operating parts of the closure fixture project completely from the assembly cap, for example downwardly.

Moreover, it is also possible to insert into the assembly cap additional devices and manipulators for cleaning and treating the interior of the closure fixture, preferably the sealing surfaces and stop means, in such a way that they can be fed into the fixture housing after dismantling the housing cover, in order to carry out the requisite operations. In this connection, the devices can be driven externally via guides in the assembly cap. In this case suction devices with collectors or filters are arranged on the assembly cap itself.

The assembly and repair times can be further shortened according to a further embodiment of the invention if several manipulator devices and several guide elements for each housing cover together with its closure device, as well as a horizontal transportation device for moving and positioning the housing cover opposite the fixture housing, are arranged in the assembly cap. In such a case the assembly cap is provided with new or repaired operating parts for the closure fixture and is combined with the fixture housing in the aforementioned manner. The non-mounted guide elements are now brought into a relative position with respect to the fixture housing such that they are able to receive the housing cover together with the closure device to be repaired. After the respective cover has been transferred to the assembly cap the transportation device together with the new housing cover is positioned opposite the fixture housing in such a way that the housing cover can be mounted on its sealing surface. In this way it is possible to replace or exchange the worn parts of the fixture without removing the assembly cap or exposing it to the atmosphere.

According to a further embodiment of the invention such an arrangement is extremely simple and reliable in operation if the manipulator devices and guide elements for both the new housing cover and the housing cover which is to be replaced are arranged together on a movable frame.

Embodiments of the object of the invention, their operation, and further advantages will be explained in more detail with the aid of FIGS. 1 and 2, in which:

DETAILED DESCRIPTION OF THE INVENTION

Figure 1:
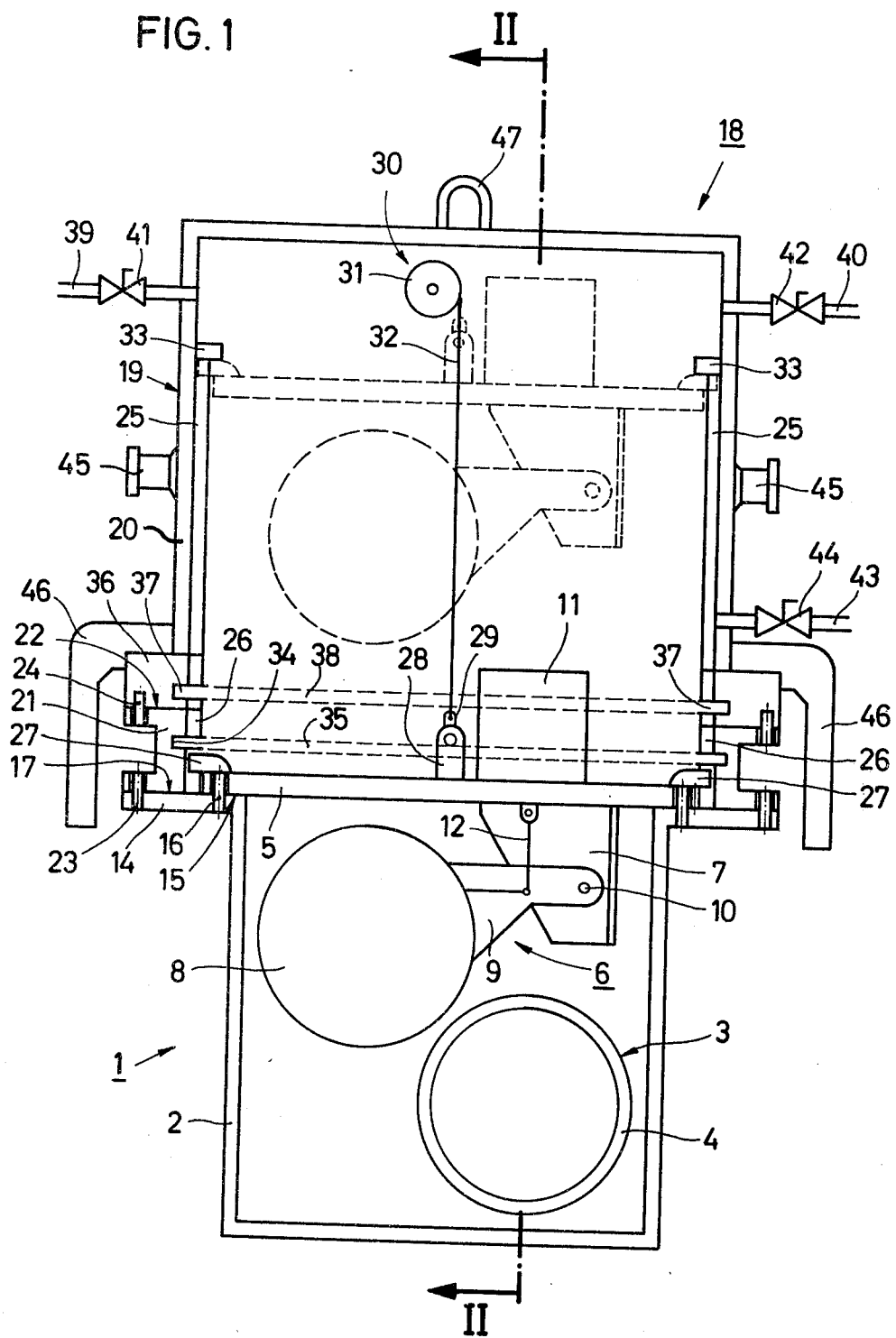
FIG. 1 is a side view of a repair device consisting of a closure fixture and assembly cap, in the direction of the inlet and outlet opening of the closure fixture, and with the front wall removed.
Figure 2:
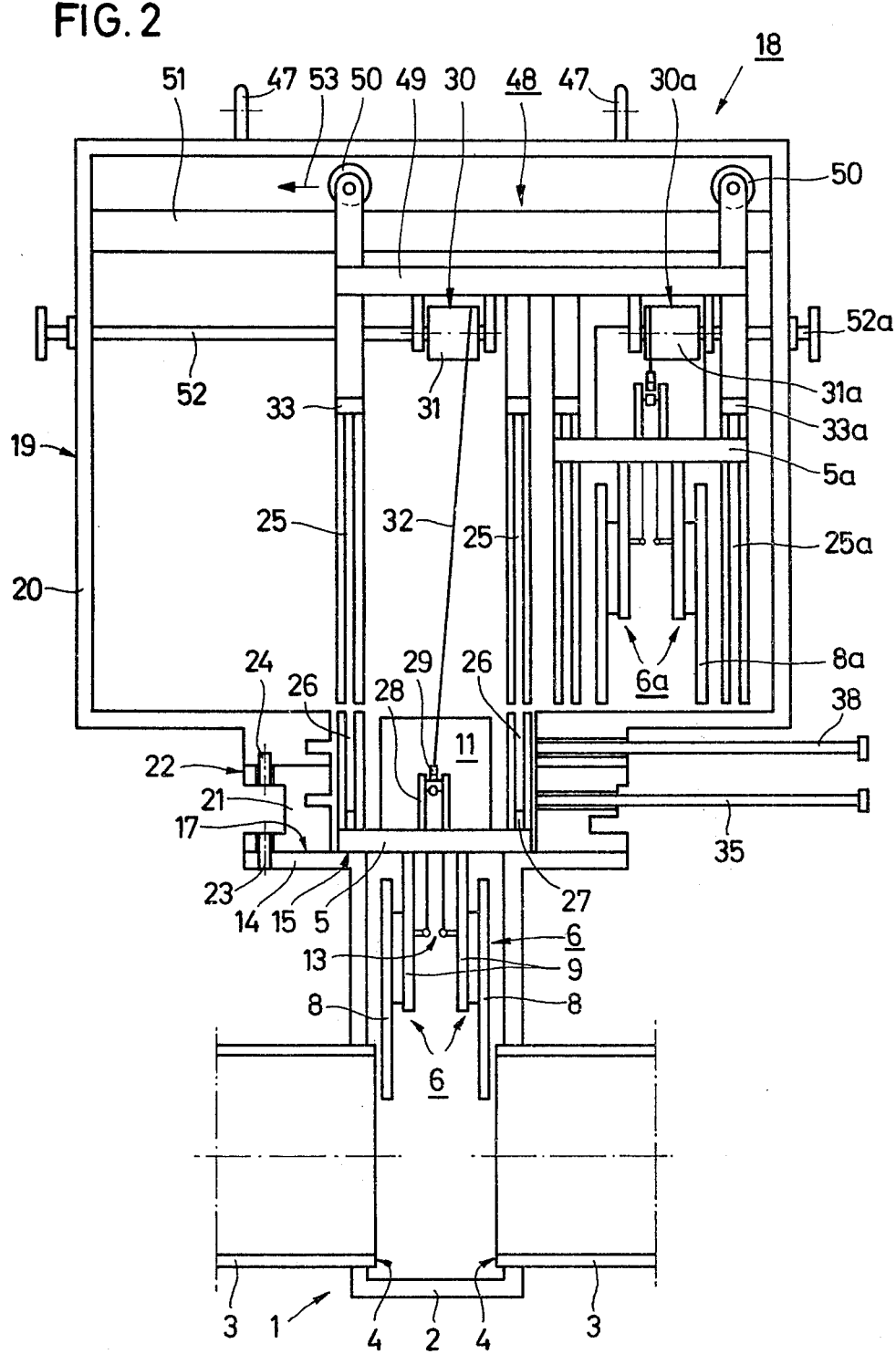
FIG. 2 is a section through the object according to FIG. 1 along the line II—II, but with the difference that the assembly cap is provided with a transportation device for the transverse movement of the manipulators and guide elements.

According to FIGS. 1 and 2, the closure fixture 1 consists of the fixture housing 2 in each of whose opposite walls is arranged a connection pipe 3 with a seal bearing surface 4, and a housing cover 5 on which is arranged a closure device 6 by means of a pedestal or pillow block 7. The closure device 6 consists of a slide plate 8 which has a seal (not shown) and is arranged on a pendulum frame 9, the latter itself being connected via a universal shaft 10 to the pedestal 7. In order to move the slide plate 8 into a position in which it is aligned with the seal bearing surface 4, a drive means 11 is provided, which acts via a drive rod 12 on the pendulum frame 9 and on an expansion mechanism 13 for urging the paired slide plates 8 on to the seal bearing surface 4. It can be seen that the closure device 6 is secured by means of the pedestal 7 on the housing cover 5, with the result that all the operating parts shown are connected to the said housing cover.

The fixture housing 2 has a continuous flange 14. A sealing surface 15 is formed at the connection point between the housing cover 5 and the flange 14, and ensures that the fixture housing 2 and the housing cover 5 are hermetically sealed. An exact positioning of all operating parts with respect to one another is achieved by means of centering bolts 16. The afore-described operating principle of a closure fixture belongs to the state of the art, and accordingly no further details need be given.

The flange 14 is greatly widened outwardly, compared with the normal design, and projects noticeably beyond the contour of the housing cover 5. In this way a further sealing surface 17 is formed, on which an assembly cap 18 can be placed.

The assembly cap 18 has a divided housing 19 consisting of a housing upper part 20 and a housing lower part 21 which enclose a dividing joint 22. An exact positioning of the housing lower part 21 on the sealing surface 17 is achieved by centering bolts 23 and an exact alignment between the housing upper and lower parts in the dividing joint 22 is achieved by means of centering bolts 24. Guide elements 25 and 26 are arranged in both the housing upper part 20 and housing lower part 21, and which are in the shape of vertical rails and are designed and arranged so that the guide elements 25 and 26 are mutually aligned. Slide members 27 securely connected to the housing cover 5 co-operate with the guide elements 25 and 26.

A hoisting bracket 28 in which a hook 29 can be inserted is arranged on the housing cover 5 and forms part of a manipulating device 30. The manipulating device consists of a cable winch 31 with lifting cable 32 to the lower end of which is secured the hook 29. The housing cover 5 together with the closure device 6 and the drive means 10 can be brought by means of the manipulating device 30 into the position shown by the dotted lines, in which the slide members 27 come to rest against stop means 33 arranged at the upper end of the guide elements 25.

The housing lower part 21 acts as a so-called extension slide member. It has a guide groove 34 in which a slide plate 35 can be inserted, which is shown only by dotted lines in FIG. 1. In a similar way the housing upper part 20 has, in the vicinity of the lower end of its housing flange 36, a guide groove 37 for receiving a slide plate 38, likewise shown only by dotted lines in FIG. 1. p It can be seen that the assembly cap 18 is dimensioned so that, when the slide plates 8 are closed, it is able to receive the housing cover 5 together with the closure device 6. The assembly cap is provided with connecting pipes 39 and 40 for connection to vacuum pumps or for admitting gases or cleansing agents. These pipes can be closed by means of suitable stop valves 41 and 42. An outlet pipe 43 together with an outlet valve 44 are located at the lowest possible position. The rinsing agent for the assembly cap 18 can be released above the slide plate 38 by means of the outlet valve 44. Pegs 45 are arranged on the housing 19, by means of which the assembly cap 18 can be suspended on a suitable device so as to allow rotation or transportation of the assembly cap 18 by means of the pegs 45. In this way, on the one hand the assembly cap can be adjusted to a suitable position for assembling the operating parts within the assembly cap, and on the other hand the assembly cap can be subjected to a pendulum or rotational movement for the purposes of washing the operating parts.

Supports 46 are furthermore arranged on the assembly cap 18 and extend outwardly and downwardly over the sealing surface 15 between the fixture housing 2 and assembly cap 18. By means of these supports the assembly cap can be placed on a base and used as a storage and transportation container for the parts of the closure fixture located therein. Rollers for moving the assembly cap may be arranged on the supports 46. An eyelet 47 serves for raising and lowering the assembly cap by means of a crane, not shown. In place of this eyelet, lifting devices may also be mounted directly on the assembly cap, thereby enabling the assembly cap to be transported automatically on to the fixture housing.

The vacuum pumps and gas containers are not shown, but may be attached to the assembly cap and are required during operation or during co-operation between the said assembly cap and the closure fixture. The manipulating devices, known per se, for tightening and untightening the screws for securing the housing cover to the fixture housing, which are likewise arranged in the assembly cap, are also not shown. Key joints, which likewise can be released by so-called slide manipulators, may also be provided in place of screws.

In FIG. 2 the same parts as in FIG. 1 are provided with the same reference numerals and repetition is therefore unnecessary. In contrast to FIG. 1, in which the guide elements 25 as well as the manipulating device 30 are securely fixed in the assembly cap 18, the relevant parts in the object according to FIG. 2 are arranged inside the assembly cap 18 so as to be movable in a horizontal direction, and the housing upper part 20 of said assembly cap is correspondingly made larger for this purpose. The lower part of the object according to FIG. 2, from the dividing joint 22 downwards, however corresponds in all essential parts to the lower part of the object of FIG. 1.

In order that the guide elements 25 and the manipulating devices can be moved horizontally, in FIG. 2 a transportation device 48 is provided which consists of a movable frame 49 with transportation rollers 50 which are able to roll along horizontal rails 51.

In the present case, for every two sets of guide elements 25 or 25a, two manipulating devices 30, 30a are arranged on the frame 49. The relevant cable winches 31 and 31a can be driven via drive shafts 52 and 52a. These are led in a vacuum-tight manner through the housing upper part 20.

In the operation phase illustrated, the frame 49 is in the right end position within the assembly cap 18. The housing cover 5 which is still on the fixture housing 2 stands immediately before its lifting motion above the guide elements 26 and 25 in the interior of the assembly cap 18. This is brought about by means of the cable winch 31 and the lifting cable 32, which initially still adopts the inclined position as shown but at the end of the lifting motion the remaining length of the cable runs exactly vertically in order to eliminate any transverse force components. Such a situation is shown in the right half of the frame 49. Thus, when the housing cover 5 together with the closure device 6 has reached the upper stop means 33, the frame 49 can be moved to the left in the direction of the arrow 53 until it has reached its end position, not shown. The aligned connection between the guide elements 25 and 26 is thereby cancelled and the corresponding guide elements 25a are brought into alignment with the stationary guide elements 26.

A new, repaired or overhauled housing cover 5a with the relevant closure device 6a is located in the right half of the frame 49 shown in FIG. 2. These operating parts pass at the end of the afore-described movement, together with the guide elements 25a, to a position above the fixture housing 2. Following this they can then be lowered into the same position, in which the housing cover 5 is shown together with the closure device 6. The housing cover 5a can now be screwed or otherwise secured to the flange 14 of the fixture housing 2. The housing cover 5 together with the defective closure device 6 is now located within the assembly cap 18 and the repaired housing cover 5a together with the likewise intact closure device 6a is inserted, ready for operation, into the fixture housing 2 without the assembly cap 18 having to be exposed to the atmosphere or the connection at the dividing joint 22 being released. The slide plates 35 and 38 can now be displaced towards the left until they hermetically seal the relevant cross sections in the assembly cap 18. The assembly cap 18 can now be withdrawn from the sealing surface 17 since the closure fixture 1 is already in a functional state. It is not necessary to separate the housing upper part 20 from the housing lower part 21, although this is still possible and is of course carried out if any difficulties should arise in assembly during the exchange of the defective and repaired closure devices 6 and 6a. In this case the slide plates 35 and 38 are locked and the assembly cap 18 is separated at the dividing joint 22 so that the both the fixture housing 2 and also the assembly cap 18 form units hermetically sealed per se. It is clear of course that within the housing upper part 20 the manipulating devices (not shown) for tightening and untightening the securement means for the housing cover 5 and 5a are arranged in a similar manner as in the case of the object according to FIG. 1.

The operation of the objects according to FIGS. 1 and 2 is as follows: Before the assembly cap 18 is placed in position the closure device 6 is turned into the position marked "OPEN". The device thus lies above the seal bearing surface 4 and cannot touch this during the lifting procedure. If advantageous for reasons of space, the outer drive parts, e.g., the motor, cylinder for the compressed medium, etc., can be dismantled or removed. The assembly cap 18 is first of all still spaced from the closure fixture 1 and, when the slide plates 35 and 38 are opened, approaches the closure fixture 1 so closely that the hook 29 can be engaged in the hoisting bracket 28. The assembly cap 18 is then placed on the centering bolts 23 and the sealing surface 17 and secured. The slide members 27 on the housing cover 5 are thereby inserted into the guide elements 25 and 26 of the assembly cap 18. The interior of the assembly cap 18 is evacuated by means of a vacuum pump, via the connecting pipe 40. By means of the manipulating device, not shown, the screw connections and key joints which connect the housing cover 5 to the fixture housing 2 are released and these manipulating devices are again withdrawn upwardly. By means of the manipulating devices 30 the housing cover 5 is moved upwardly in the guides 25 and 26 until it rests against the stop means 33 and is in the position shown by the dotted lines. The slide plate 35 is now locked and the interior of the assembly cap 18 is again evacuated via the connecting pipe 40. Toxic or radioactive process gases can be pumped off in this evacuation and collected in suitable containers or passed through filters. The slide plate 38 can now be sealed and the housing upper part 20 can be removed from the housing lower part 21 and lifted from the centering bolts 24. The housing 2 of the closure fixture 1 is now sealed in a gas-tight manner by means of the slide plate 35, and the assembly cap 18 by means of the slide plate 38. The space between the two slide plates has been evacuated and thus contains only slight amounts of residual gas. Before the housing upper part is removed this space is conveniently flooded by means of a valve, not shown. The gas-tight closure of all parts such as the fixture housing 2, closure device 6 and housing cover 5 which come into prolonged contact with the process gas ensures that no contamination of the assembly area and thus no danger to the assembly personnel can arise.

The assembly cap 18 and its housing upper part 20 now serves as a transportation container in the cleaning area, or is itself used as a cleaning area. To this end, a cleansing agent can be introduced into the assembly cap via a connecting pipe 39. The assembly cap can be rotated about the peg 45 and the cleansing agent is removed via the outlet pipe 43. After cleaning and subsequent drying, in which hot drying gases can be introduced via the pipes 39, 40 and 43, the slide plate 38 can be opened so that the operating parts within the assembly cap can be dismantled and repaired. To simplify assembly, the housing cover 5 together with the operating parts can however also be brought by means of the manipulating device 30 into another position fixed by stop means.

If the operating parts have been repaired or an exchange unit consisting of a housing cover 5 and operating parts is available in another assembly cap, the latter is placed, without the housing lower part on the centering bolts 24 of the housing lower part 21, the slide plate 38 is opened, and the assembly cap is evacuated via the connecting pipe 40. By opening the slide plate 35 or by means of a by-pass the assembly cap is flooded with the process gas as long as there is not a vacuum also in the fixture housing 2. The housing cover 5 within the guide elements 25, 26 is placed by means of the manipulating device 30 on the centering bolts 16 and flange 14. By means of the securement manipulating devices the securement means are mounted between the housing cover 5 and fixture housing 2, and the housing cover 5 is tightly secured on the fixture housing 2. Following this the assembly cap 18 is evacuated via the connecting pipe 40 in order to remove residual amounts of the process gas. The assembly cap is then flooded by means of a cleansing gas or air, via the connecting pipe 39, and, if there is not a repeated evacuation with the introduction of cleansing gases, the assembly cap 18 is lifted from the flange 14, the hook 29 is removed from the hoisting bracket 28, and the assembly cap 18 is transported away. After assembly and after the parts of the drive 11 and the relevant energy supplies have been connected, the closure fixture 1 can be brought into operation again. The assembly cap is then available, after having been suitably cleaned, for further co-operation with this or another closure fixture.

What is claimed is:

1. In a closure fixture having a slide member or valve for radioactive and toxic media, a fixture housing, a movable mounted housing cover connectable to the housing via a first sealing surface, and a closure device with drive means arranged on the housing cover, the improvement wherein the fixture housing comprises a second sealing surface integral therewith and surrounding the first sealing surface and an assembly cap which is sealingly mountable on the second sealing surface and which has an interior configured to receive the housing cover and closure device for the disassembly thereof from the fixture housing and which comprises guide elements for guiding the movement of the housing cover between its connection at its first sealing surface on the fixture housing to an end position in the assembly cap.

2. The closure fixture according to claim 1, wherein the second sealing surface for the assembly cap comprises a widening of the first sealing surface for the housing cover.

3. The closure fixture according to claim 1, wherein the second sealing surface for the assembly cap comprises a sealing flange.

4. An assembly cap for use with a closure fixture having a slide member or valve for radioactive and toxic material, a fixture housing, a housing cover connected to the housing via a first sealing surface, a closure device with drive means arranged on the housing cover and a second sealing surface surrounding the first sealing surface and integral with the fixture housing, the assembly cap configured to receive the housing cover and closure device therein for the disassembly thereof from the fixture housing and comprising means for sealingly mounting the same to the second sealing surface guide elements for guiding the movement of the housing cover between its connection at its first sealing surface on the fixture housing to an end position in the assembly cap and at least one manipulating device for transferring the housing cover together with the closure device for transferring the housing cover together with the closure device into the interior of the assembly cap.

5. The assembly cap according to claim 4, wherein the assembly cap further comprises supports which extend downwardly over the second sealing surface between the fixture housing and assembly cap.

6. The assembly cap according to claim 4, wherein the assembly cap further comprises a connecting pipe for connection to a vacuum pump.

7. The assembly cap according to claim 4, wherein the assembly cap further comprises inlet and outlet pipes for charging the assembly cap with a cleansing medium.

8. An assembly cap for use with a closure fixture having a slide member or valve for radioactive and toxic material, a fixture housing, a housing cover connected to the housing via a first sealing surface, a closure device with drive means arranged on the housing cover and a second sealing surface surrounding the first sealing surface and integral with the fixture housing, the assembly cap configured to receive the housing cover and closure device therein for the disassembly thereof from the fixture housing and comprising a divided housing including a dividing joint running substantially parallel to the second scaling surface between the fixture housing and the assembly cap to define a housing upper part and a housing lower part and closure elements slidably mounted in the housing upper part and in the housing lower part, means for sealingly mounting the same to the second sealing surface and at least one manipulating device for transferring the housing cover together with the closure device into the interior of the assembly cap.

9. The assembly cap according to claim 8, wherein the guide elements in the housing upper part and the guide elements in the housing lower part are in alignment with one another.

10. An assembly cap for use with a closure fixture having a slide member or valve for radioactive and toxic material, a fixture housing, a housing cover connected to the housing via a first sealing surface, a closure device with drive means arranged on the housing cover and a second sealing surface surrounding the first sealing surface and integral with the fixture housing, the assembly cap configured to receive the housing cover and closure device therein for the disassembly thereof from the fixture housing and comprising means for sealingly mounting the same to the second sealing surface, a plurality of manipulating devices each with a corresponding housing cover having a closure device thereon, a plurality of guide elements for each housing cover and a horizontal transportation device for moving and positioning the housing covers opposite the fixture housing.

11. The assembly cap according to claim 10, wherein the manipulating devices and the guide elements are arranged together on a movable frame.

12. The assembly cap according to claim 10, wherein the movable guide elements in the housing upper part are movable into a locked covering arrangement with stationary guide elements in the housing lower part.

* * * * *